US007319980B2

(12) United States Patent
Kronenberger

(10) Patent No.: US 7,319,980 B2
(45) Date of Patent: Jan. 15, 2008

(54) METHOD AND A COMPUTER NETWORK SERVER FOR FACILITATING SALE OF AN OBJECT

(75) Inventor: Robert A. Kronenberger, Deerfield, IL (US)

(73) Assignee: American Needle, Buffalo Grove, IL (US)

( * ) Notice: Subject to any disclaimer, the term of this patent is extended or adjusted under 35 U.S.C. 154(b) by 705 days.

(21) Appl. No.: 09/833,305

(22) Filed: Apr. 10, 2001

(65) Prior Publication Data

US 2002/0147664 A1    Oct. 10, 2002

(51) Int. Cl.
*G06Q 30/00* (2006.01)
*G06F 17/30* (2006.01)
(52) U.S. Cl. .......................................... 705/26; 705/27
(58) Field of Classification Search ................ 705/26, 705/27; 700/130, 131, 132, 136, 137, 138
See application file for complete search history.

(56) References Cited

U.S. PATENT DOCUMENTS

| | | | |
|---|---|---|---|
| 5,383,111 A * | 1/1995 | Homma et al. ............... | 705/27 |
| 6,344,853 B1 * | 2/2002 | Knight ......................... | 705/26 |
| 6,414,693 B1 * | 7/2002 | Berger et al. ................ | 345/641 |
| 6,591,250 B1 * | 7/2003 | Johnson et al. ............... | 705/51 |
| 2005/0131571 A1 * | 6/2005 | Costin ......................... | 700/132 |

FOREIGN PATENT DOCUMENTS

JP       02003030276 A  *  1/2003

OTHER PUBLICATIONS

"Quaartz Inc. and Branders.com Partner to Advance The 'Dot Com'Customer Experience," Business Editors, Business Wire, New York, May 15, 2000, p. 1.*
"Small business holiday gift ideas," Jane Applegate, Chicago Sun Times, Chicago, Ill, Oct. 24, 2000, p. 52.*
"Online Promotional Products Leaders, Branders.com and eCompanyStore, Form Alliance," Business Editors/High Tech Writers, Business Wire, NY, Jul. 18, 2000, p. 1.*
"Scotches-R-Us," PR Newswire, Potomac, Jul. 10, 2000, vol. 55, Issue 28, p. 1.*
http://www.spclevents.com, May 11, 2000, revtrieved via WayBackMachine.org, <http://web.archive.org/web/*/www.spclevents.com.*

* cited by examiner

*Primary Examiner*—Matthew S. Gart
(74) *Attorney, Agent, or Firm*—Wood, Phillips, Katz, Clark & Mortimer

(57) ABSTRACT

A method for facilitating sale of objects such as caps over the Internet, including providing a user input for selecting a display icon representing the object offered for sale, providing a user input for a design element selected by the user to be included on the object, and providing a display illustrating the cap represented by the selected display icon with the user selected design element at the user selected location on the cap. A user input for creating text to be included on the cap is also provided. A computer network server includes a display icon generator transmitting a display icon representing an object such as a cap, a request generator transmitting a request for user input to select the display icon and to select a design element to be included on the object, and a processor receiving display icon requests and selected design element and generating a visual representation of the user selected design element, which may include text, on the object represented by the selected display icon.

18 Claims, 3 Drawing Sheets

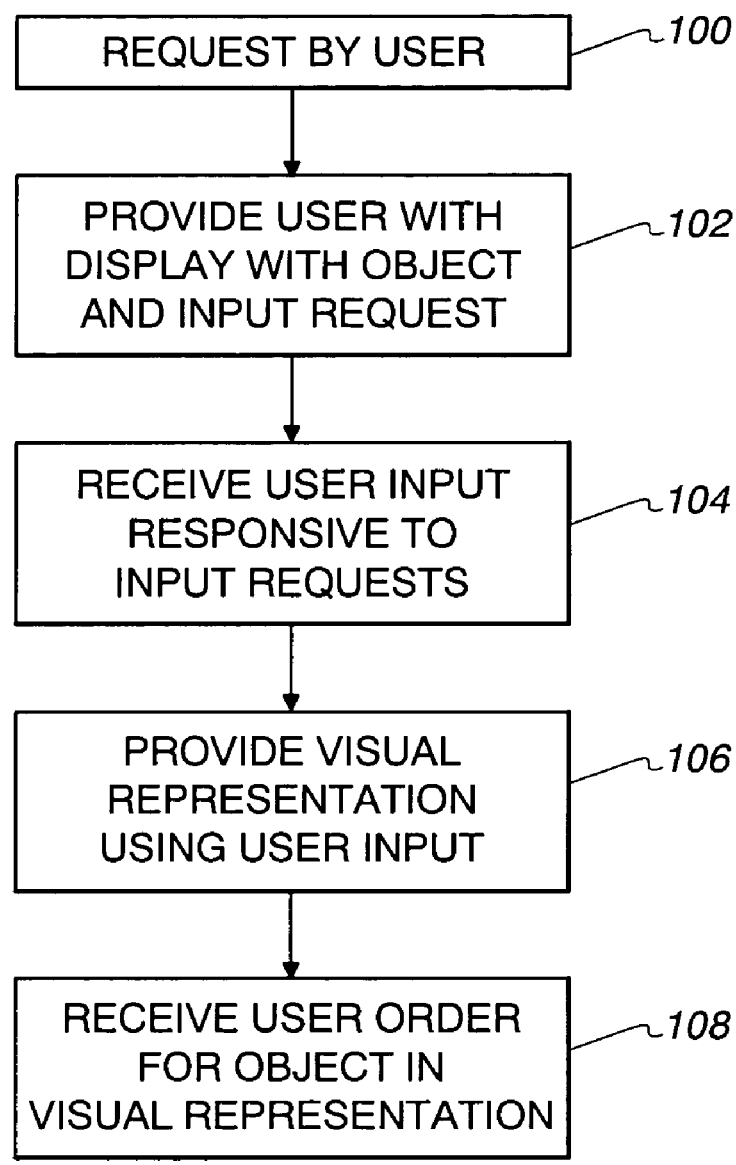

METHOD AND A COMPUTER NETWORK SERVER FOR FACILITATING SALE OF AN OBJECT

BACKGROUND OF THE INVENTION

The present invention is directed toward sales over computer networks, and particularly toward the sale of purchaser designed caps over the Internet.

With many manufactured items, particularly clothing items such as caps, the manufacturers are required to manufacture a large number of different styles in the hope of attracting the widely varying tastes of their potential customers. Such practices can result in large costly inventories, necessitating higher prices to account for the carrying of such inventory and thereby also potentially curbing the sale of the products because of the higher prices. Further, no matter how many different styles a manufacturer may make available, it is impossible to anticipate every style which each customer may want, or to anticipate which styles may intrigue the many different customers sufficiently to induce them to purchase the product when they had not been expecting to purchase a product in the market at the time.

The present invention is directed toward overcoming one or more of the problems set forth above.

SUMMARY OF THE INVENTION

In one aspect of the present invention, a method is provided for facilitating sale to a potential customer of an object over a computer network, said object having a predetermined three-dimensional shape. The method includes providing the potential customer with the following over the computer network: a display with at least one display icon representing an object having the predetermined three-dimensional shape, a user input for a design element selected by the user to be included on the object, and a display of the user selected design element on the object represented by the selected display icon.

In one form of the invention, a plurality of display icons are provided, and an input is provided for the user to select one of the plurality of display icons prior to providing the display of the user selected design element on the object represented by the selected display icon.

In other forms, the display icons are different perspective views of a predetermined three-dimensional shape of one object, and/or represent different objects.

In still other forms, user created text may be included, including in a selected one of a plurality of design elements; a user input may be provided for selecting among different portions of the object for placement of the design element (such as the visor and segments of the crown of a cap).

In yet another form, a user input may be provided for ordering the object with the user selected design element and receiving a user order from the user input for ordering the object with the user selected design element.

In another aspect of the invention, a method for facilitating sale of caps over the Internet is provided, including providing a user input for selecting a display icon representing a cap offered for sale, providing a user input for a design element selected by the user to be included on the cap, and providing a display illustrating the cap represented by the selected display icon with the user selected design element at the user selected location on the cap.

In one form of the invention, a user input is provided for a user selection of the location on the cap for placing the user selected design element. Various forms such as described with the first described aspect of this invention may be also be used with this aspect of the invention, including providing a user input for creating text to be included on the cap.

In another aspect of the invention, a computer network server for facilitating sale of an object having a predetermined three-dimensional shape is provided, including a display icon generator transmitting a display icon representing an object having the predetermined three-dimensional shape, a request generator transmitting a request for user input to select the display icon and to select a design element to be included on the object, and a processor receiving the display icon requests and selected design element and generating a visual representation of the user selected design element on the object represented by the selected display icon.

In one form, the display icon generator transmits a plurality of display icons, and the processor generates a visual representation of the user selected design element on the object represented by the selected one of the display icons. In another form, the display icon generator transmits display icons which are different perspective views of a predetermined three-dimensional shape of one object. In still another form, the object is a cap, and the request generator further transmits a request for user input to create text to include in the selected design element.

BRIEF DESCRIPTION OF THE DRAWINGS

FIG. 5 is a flow chart of the method of the present invention.

DETAILED DESCRIPTION OF THE INVENTION

Figure 1:
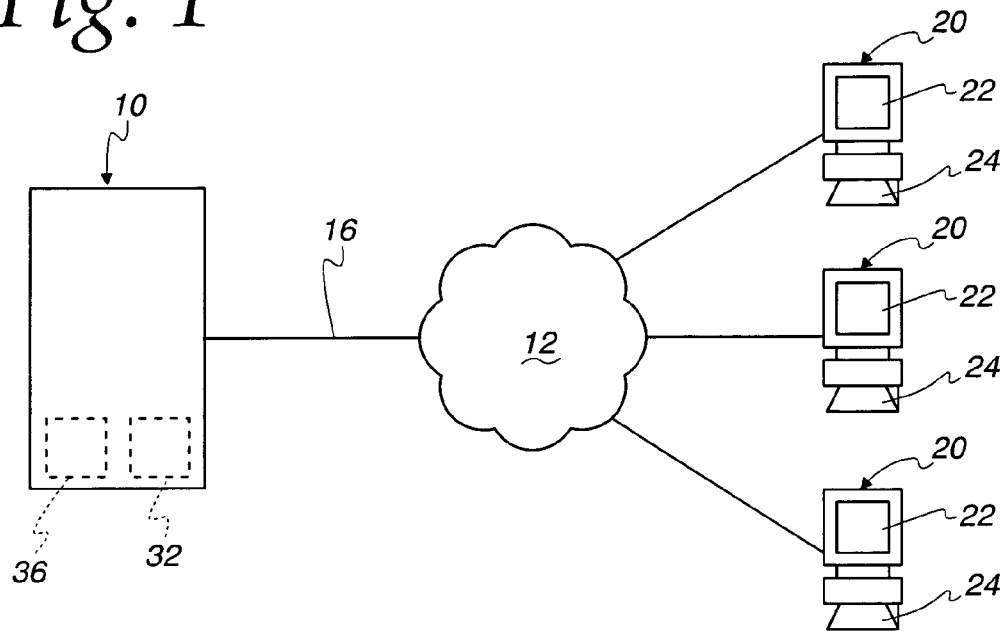
FIG. 1 is a view of an exemplary computer network with which the present invention may be used.

In accordance with the present invention, a server 10 may be provided with a computer network 12 such as shown in FIG. 1. The server 10 includes a suitable link 16 to the network 12, such as the Internet (although the invention could also be used with a private network), which is itself linked to a plurality of user computers 20. Typically, each of the user computers 20 will include a display 22 and an input 24 such as a keyboard and/or mouse.

The server 10 includes a processor 30 and a memory 32. The processor 30, memory 32 and link 16 cooperate to generate and transmit selected information to the network 12, with the network 12 conveying that information to an appropriate one or more of the user computers. Specifically, the server 10 may serve as a home site for a business which is selling objects to users over the network 12. Thus, when a specific user computer 20 communicates with the home site on the server 10 (for example, via an Internet url address), the processor 30 and memory 32 will generate and then transmit (via the link 16 and network 12) information to that specific user computer 20. Specifically, the server 10 will transmit data for display on the user computer display 22 which, in accordance with the present invention as discussed further below, will include a display icon representing the object which the business is selling. In the instance of a baseball cap, the display icon will be a view of a baseball cap. The server 10 will also transmit a request for user input, which request will also be displayed on the user computer display 22.

Figure 2:
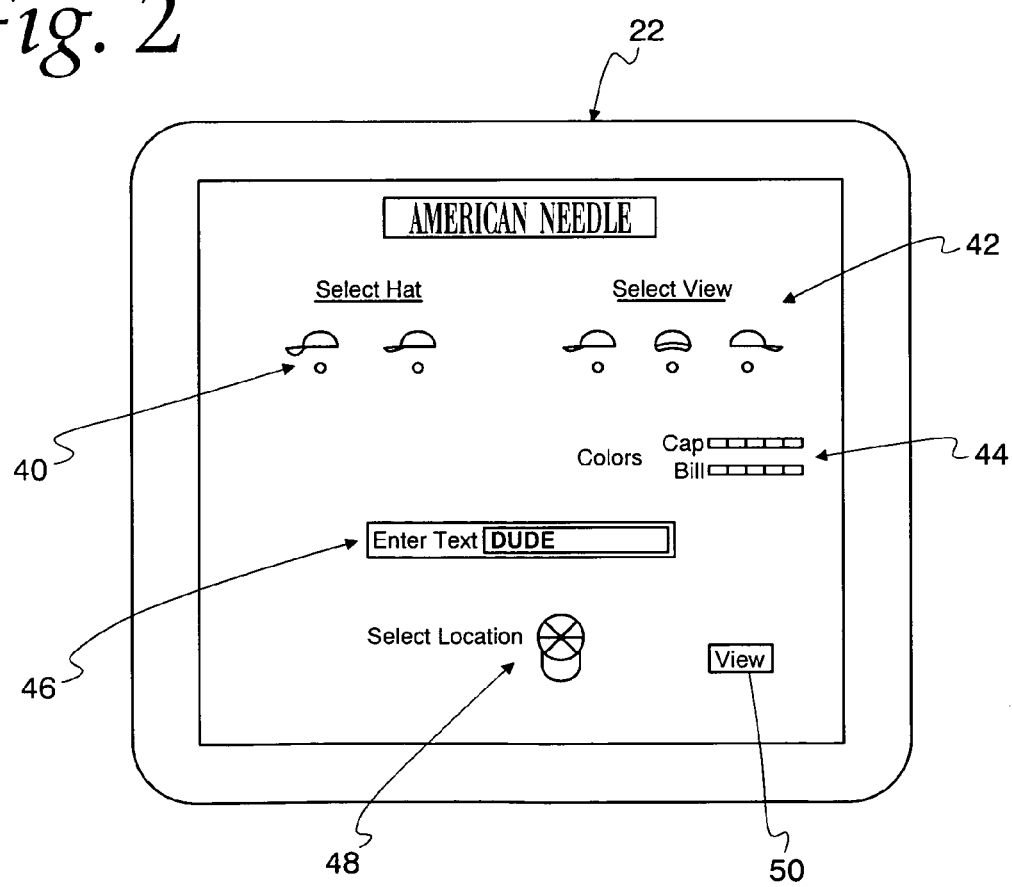
FIG. 2 is a user computer display in accordance with a first embodiment of the present invention.

FIG. 2 illustrates a user computer display 22 which has received the display data and request for user input which has been transmitted by the server 10 as discussed above. In the example embodiment shown in FIG. 2, there are multiple requests for user input which have been transmitted and displayed: a request 40 to select a cap style (including a choice of different cap styles), a request 42 to select a view of the cap to be seen (for example, front or side views), a request 44 for a color (including, for example, separate requests for the color of different portions of the hat), a request 46 for the user to input the text he may desire on the hat, and a request 48 to identify the portion of the cap where the user wishes to have the text located.

Figure 3:
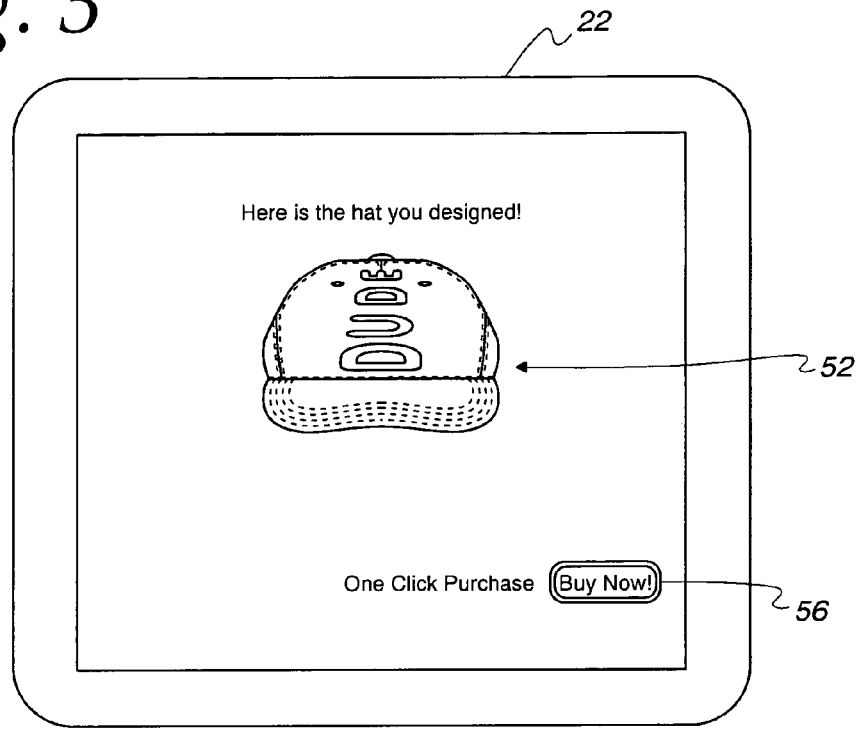
FIG. 3 is a second user computer display in accordance with the first embodiment.

A VIEW request button 50 is also provided which enables the user to request to view a cap having the characteristics which he has chosen via the requests 40-48. By clicking that request button 50, a request may be transmitted to the server 10 which will generate a visual representation 52 of the selected cap design and transmit it to the user computer 20 for display on the display 22 such as shown in FIG. 3. A purchase information request 56 is also provided, whereby the user may request to purchase the particular cap which he has designed and that request will be transmitted to the home site server 10 for processing of the order.

Figure 4:
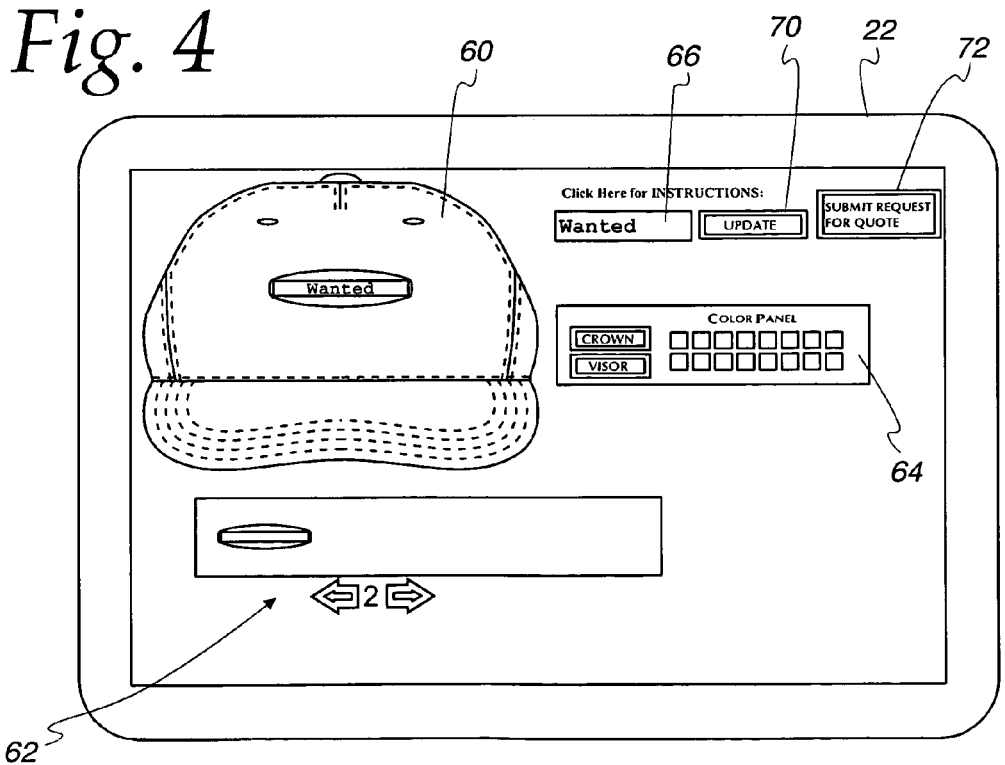
FIG. 4 is a user computer display in accordance with a second embodiment of the present invention.

Another embodiment of the invention is shown in FIG. 4. In this embodiment, a hat illustration 60 is generated by the server 10 and transmitted to a user computer 20 together with requests for user input relating to a design element to include on the hat (at 62), colors for different portions of the cap such as the crown and the visor (at 64), and for the text to include in the design element (at 66). Once the user has input his desired choices responsive to these requests (at 62-66), he may click the UPDATE request button 70 which will cause a visual representation of the cap to be changed to incorporate the requested features such as illustrated in FIG. 4. By including the requests on the displayed page which includes the visual representation 60 of the cap, the user may easily input different choices to vary his chosen design.

A request for quote button 72 may also be included which enables the business to give the user a price for the cap which he has designed (for example, more text and/or different design elements may involve greater cost to the business to manufacture and therefore might result in a higher cost. A request to purchase option can also be included with the response to any request for quote.

It should be appreciated that the various user design inputs which are illustrated in the FIGS. 2-4 embodiments are merely illustrative, and that other design elements could be used. For example, different colors could be provided for different panels of a cap, text could be oriented differently (e.g., vertically or horizontally) and in different styles and sizes, and more than one design element could be added to a cap (e.g., on different panels and/or on the visor). With all such user options which are provided, the server 10 may generate a request relating to those options and, responsive to user input responsive to those requests, may generate a visual representation of a cap which incorporates those design elements.

FIG. 5 illustrates the method according to the present invention. Responsive to a request by a user at 100 (e.g., the user transmits the business' url to the network 12), the server 10 provides the user computer 20 with a display which includes an icon for the object to be sold (e.g., a baseball cap) and with requests for user input relating to the design (at 102). The input requests may be of any suitable type such as previously described, which requests will allow the user to make their own design of the object for possible purchase by the user.

The server 10 may then receive user input at 104 responsive to the input requests and, responsive to that input, will generate a visual representation or display of the object in accordance with those requests and provide that visual representation to the user computer 20 at 106. Assuming that the user then wishes to purchase such an object and provides input to that effect, the server 20 receives the user order for the user's design at 108.

It should now be appreciated that the present invention may be advantageously used by any business to facilitate its sale of three dimensional objects, by enabling potential purchasers to create their own design according to their own tastes, as well as to enable them to see their design immediately so that they can best judge their design and, if they like it, purchase it. Accordingly, a virtually infinite number of different designs may be provided to potential customers for possible purchase, with those potential customers being able to choose a design according to their own tastes which they will be able to consider to be uniquely theirs, all of which will facilitate the sale of such objects via maximized satisfaction of potential customers.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A method for facilitating sale to a potential customer of an object over a computer network, said object having a predetermined three-dimensional shape, the method comprising:

over the computer network, providing the potential customer with a display with a plurality of display icons representing different perspective views of a predetermined three-dimensional shape of an object;

over the computer network, providing the potential customer with a user input through which a design element selected by the potential customer is included on said object at a first location on the object;

providing an input for said potential customer through which any of said plurality of display icons is selected; and over the computer network, and in response to the user inputs, providing the potential customer with different perspective views of the object with the selected design element on the object at the first location represented by the selected display icon, wherein through said user inputs at least first and second different perspective views of said object with the selected design element displayed thereon at the first location are viewable, with the design element at the first location shown in each of the first and second different perspective views.

2. The method of claim 1, wherein said display icons represent a plurality of different objects, including a plurality of different perspective views for each object.

3. The method of claim 1, wherein said object is a cap.

4. The method of claim 1, wherein said design element is user created text.

5. The method of claim 1, wherein said design element may be selected from among a plurality of design elements, where user selected text may be included in at least one of said plurality of design elements.

6. The method of claim 1, further comprising providing a user input for selecting among different portions of the object for placement of the design element.

7. The method of claim 6, wherein said object is a cap having a crown and visor, and said object portions include at least one segment of the crown and the visor.

8. The method of claim 1, further comprising providing a user input for ordering the object with the user selected design element and receiving a user order from said user input for ordering the object with the user selected design element.

9. A method for facilitating sale of caps over the Internet, comprising:

over the Internet, providing a user input through which at least one display icon is selected by a user from a plurality of display icons, each of said display icons representing different perspective views of one cap design offered for sale;

over the Internet, providing a user input for selecting a display element to be included on said one cap; and over the Internet, providing a display illustrating the selected different perspective views of the one cap corresponding to the selected display icons with the display element at a first user selected location on said cap, wherein said different perspective views of the one cap design include at least two different perspective views of the one cap on which the display element at the same first location on the one cap is viewable on the display, with the display element shown in each of the at least two different perspective views.

10. The method of claim 9, further comprising providing a user input for a user selection of the location on said cap for placing said user selected design element.

11. The method of claim 10, further comprising providing, over the Internet, a user input for selecting among different portions of the cap represented by the selected display icon for placement of the user selected design element.

12. The method of claim 11, wherein said cap includes a crown and a visor, and said cap portions include at least one segment of the crown and the visor.

13. The method of claim 9, further comprising providing a user input for ordering the cap with the user selected design element and receiving a user order from said user input for ordering the cap with the user selected design element.

14. A computer network server for facilitating sale of objects having predetermined three-dimensional shapes, said server comprising:

a display icon generator transmitting selected ones of a plurality of display icons over a computer network, said display icons representing a plurality of objects each having one of the predetermined three-dimensional shapes and a plurality of different perspective views of each of the three-dimensional shapes;

a request generator transmitting, over the computer network, a request for user input to identify a selected display icon and to select a design element to be included on said object at a first location on the object; and a processor receiving display icon requests and selected design elements over the Internet and generating a visual representation of the user selected design element on the object represented by the selected display icon, wherein at least two of said different perspective views of each three-dimensional shape include said selected design element at the same first location in the generated visual representation, with the selected design element shown in each of the at least two different perspective views.

15. The server of claim 14, wherein said display icon generator transmits a plurality of display icons, and said processor generates a visual representation of the user selected design element on the object represented by the selected one of said display icons.

16. The server of claim 14, wherein said request generator further transmits a request for user input to create text to include in the selected design element.

17. The server of claim 14, wherein said object is a cap.

18. The server of claim 14, wherein said computer network is the Internet.

* * * * *